United States Patent

Hunold et al.

[11] Patent Number: 5,951,279
[45] Date of Patent: Sep. 14, 1999

[54] METHOD AND APPARATUS FOR REDUCING POLLUTANT CIRCULATIONS IN THE MANUFACTURE OF CEMENT CLINKER FROM RAW MEAL

[75] Inventors: Peter Hunold, Odenthal; Günter Keller, Bergisch Gladbach; Frank Carstens, Köln; Hans W. Meyer, Langenzenn, all of Germany

[73] Assignee: KHD Humboldt Wedag AG, Köln, Germany

[21] Appl. No.: 09/070,613

[22] Filed: Apr. 30, 1998

[30] Foreign Application Priority Data

Apr. 30, 1997 [DE] Germany ............................ 197 18 259

[51] Int. Cl.⁶ ...................................................... F27B 7/02
[52] U.S. Cl. ............................. 432/106; 432/14; 432/58; 106/739
[58] Field of Search .................... 432/14, 16, 58, 432/106; 106/739, 748, 749

[56] References Cited

U.S. PATENT DOCUMENTS

| 3,813,210 | 5/1974 | Miskolczy et al. | 432/58 |
| 4,299,560 | 11/1981 | Nakamura et al. | 432/58 |
| 4,425,092 | 1/1984 | Brachthauser et al. | 432/106 |
| 4,469,664 | 9/1984 | Abelitis et al. | |
| 4,955,986 | 9/1990 | Maury et al. | 432/58 |
| 5,698,027 | 12/1997 | Borgholm et al. | 432/106 |

FOREIGN PATENT DOCUMENTS 3215793  3/1983  Germany .

OTHER PUBLICATIONS

Probleme der Elektroentstaubung hochalkalichloridhaltiger Abgase aus Teilgasabzügen bei Wämetauscher–Trockendrehöfen in DE–Z "Zement–Kalk–Gips" Nr. May, 1978 (pp. 236–238).

*Primary Examiner*—Teresa Walberg
*Assistant Examiner*—Gregory A. Wilson
*Attorney, Agent, or Firm*—Hill & Simpson

[57] ABSTRACT

A method and apparatus is provided for use in cement clinker production apparatuses, particularly those with a short rotary tubular kiln, in which pollutant containing raw meals are utilized, wherein a bypass vent or gas sub-vent, exhausts a sub-stream of the rotary kiln exhaust. It is proposed to introduce meal or processing dust as condensation nuclei into the upper region of the kiln inlet chamber, these nuclei being entrained by the vented gas sub-stream. This vented gas sub-stream is subsequently further cooled by the introduction of water and/or cool air prior to its de-dusting in a dust trap.

20 Claims, 1 Drawing Sheet

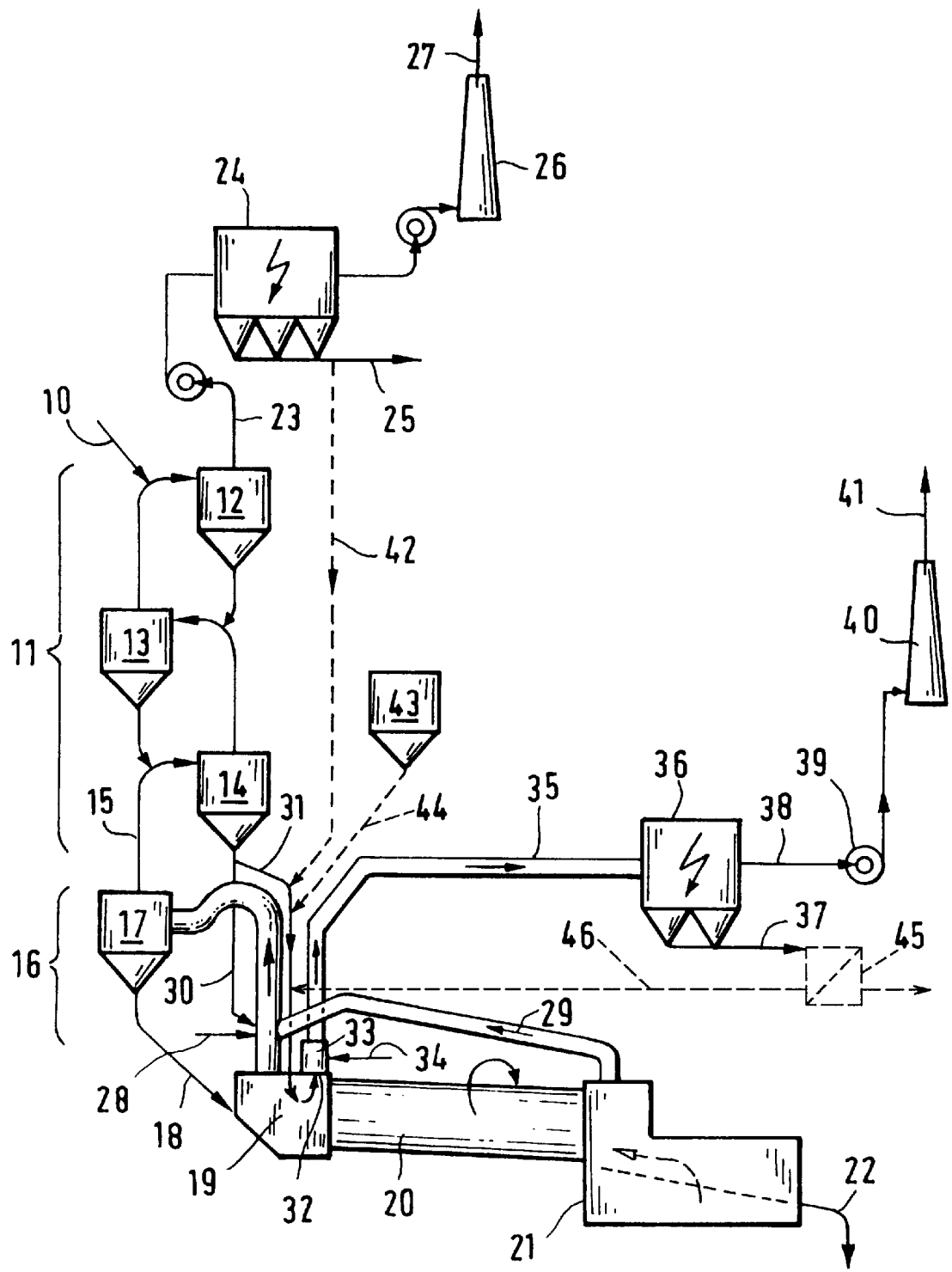

METHOD AND APPARATUS FOR REDUCING POLLUTANT CIRCULATIONS IN THE MANUFACTURE OF CEMENT CLINKER FROM RAW MEAL

BACKGROUND OF THE INVENTION

The invention relates to a method for reducing pollutant circulations, particularly of circulations of alkali and chlorine compounds in an apparatus for the manufacture of cement clinker from raw meal which is preheated in at least one train of pipes of a heat exchanger (particularly a cyclone suspension type heat exchanger) permeated by the exhaust of a rotary tubular kiln and is burned into cement clinker in the sintering zone of the rotary tubular kiln. The clinker is cooled in a cooler, connected downstream, with a bypass gas vent, or respectively a gas sub-vent for letting out a pollutant containing sub-stream of the exhaust of the rotary kiln from the rotary kiln inlet chamber, with cooling and de-dusting of the vented gas sub-stream.

It is known in cement technology that many of the requisite materials for cement clinker manufacture contain secondary constituents such as alkali compounds, chlorine, sulfur, heavy metals, etc. which evaporate in the region of the sintering zone as alkali chloride and alkali sulfate compounds, then condense again in the preheating region and thus build circulations which not only adversely affect the quality of the cement clinker, but can also considerably damage the combustion process itself. To suppress an alkali circulation in a cement clinker combustion apparatus, as well as to reduce the alkali content in the cement clinker, it is known to bifurcate and lead away a part of the kiln exhaust containing alkali compounds through what is known as a bypass gas vent, or respectively, sub-vent, at the lower region of the exhaust off take main between rotary tubular kiln and suspension type gas pre-heater, or respectively, calcinator, i.e., at a temperature level at which the volatile constituents are not yet condensed, in order to then subsequently introduce into the gas sub-stream exhaust conduit, raw meal and processing dust as condensation nucleus, as well as a cooling medium such as water and/or outside air, and to allow the pollutants contained in the gas sub-stream to condense at the solid matters (DE-A-32 15 793 as well as, e.g., essay "Probleme der Elektroentstaubung hochalkali-chloridhaltiger Abgase aus Teilgasabzügen bei Wärmetauscher-Trockendrehöfen" in DE-Z "Zement-Kalk-Gips" Nr. 5/1978 pages 236 to 238). If the vented gas sub-stream and the dust drawn out therewith are high in alkali content, then the bypass filter dust separated out of the gas sub-stream must be rejected, as well as the potentially still insufficiently purified gas sub-stream itself.

On the other hand, the development of rotary tubular kilns for cement clinker combustion is directed to the goal of utilizing the shortest possible rotary tubular kilns which are still mounted on two mounting stations. Short rotary tubular kilns result in relatively high kiln exhaust temperatures of, e.g., 1300° C. which lead to a high thermal loading of the kiln inlet chamber. However, it would not be possible to cool the kiln inlet chamber by means of a cooling jacket, precisely because raw meals, which, due to their chemical constituents, tend toward conglutinations, would bake on to the walls in the kiln inlet chamber.

SUMMARY OF THE INVENTION

It is an object of the invention to provide a way in which the production apparatus can be driven reliably and the highly thermally loaded rotary kiln inlet chamber can therein be protected in cement clinker production apparatuses, particularly with a short rotary tubular kiln and with utilization of pollutant-containing raw meal tending to bake, as well as with a bypass vent, or respectively, a gas sub-vent for venting a sub-stream of the rotary kiln exhaust.

This object is inventively achieved by introducing the meal and the dust developed during processing into the upper region of the rotary kiln inlet chamber as condensation nuclei, being entrained by the vented gas stream, this sub-stream being subsequently further cooled by the introduction of water and/or cool air prior to its de-dusting in a dust trap. Preferably a conduit is led into the rotary kiln chamber in the vicinity of the gas sub-stream exhaust opening, for the conveyance of meal and/or processing dust developed in processing, and a mixing chamber is arranged at the gas sub-stream vent opening outside the kiln inlet chamber, this mixing chamber being for the admixing of water and/or cool air into the gas sub-stream which is filled with condensation nuclei.

In the inventive production of cement clinker with a bypass vent, or respectively, a gas sub-vent, raw meal, or respectively, processing dust are not introduced into the gas sub-stream as condensation nuclei after this sub-stream has been let out of the kiln inlet chamber; rather, it is suggested for the first time to introduce such condensation nuclei into the gas sub-stream before this sub-stream is removed from the kiln inlet chamber (i.e., meals, or respectively, processing dusts developing in processing are directly inserted into the upper region of the kiln inlet chamber as condensation nuclei, and indeed approximately in the vicinity of the exhaust opening for the gas sub-stream, so that it is assured that the solid materials (meals, processing dust) introduced into the upper region of the kiln inlet chamber are in fact then entrained by the gas sub-stream. The artificial dust circulation considerably raises the concentration of the condensation nuclei in the gas sub-stream. The condensation nuclei already introduced into the kiln inlet chamber fulfill at least two tasks: The rotary kiln gas does not cool itself off at the cooled walls of the kiln inlet chamber, but rather at the condensation nuclei, which are colder relative to the hot rotary kiln exhaust gases (e.g., from 1300° C. to 1500° C.), whereby the highly thermally loaded kiln inlet chamber is protected, for one. On the other hand, the gaseous, or respectively, vaporous pollutants contained in the rotary kiln exhaust (such as alkali chloride and alkali sulfate, in particular) can begin to condense (freeze out, or respectively, to sublimate) in the kiln inlet chamber at the condensation nuclei brought thereinto. In any case, the condensation nuclei are sucked out from the kiln inlet chamber with the gas sub-stream, which is appropriately further cooled (e.g., to 370° C.) outside the kiln inlet chamber in a mixing chamber arranged above the exhaust opening for the gas sub-stream by means of an admixture of water and/or cool air, in order to freeze out with certainty all condensible pollutants from the gas sub-stream, which pollutants can be subsequently separated out safely from the purified gas sub-stream in a dust trap, specifically, for example, by electrostatic dust traps.

BRIEF DESCRIPTION OF THE DRAWINGS

The invention and its other features and advantageous are further detailed in the exemplifying embodiment schematically depicted in the drawing.

DETAILED DESCRIPTION OF THE PREFERRED EMBODIMENTS

The drawing shows an apparatus for the manufacture of cement clinker from cement raw meal which contains pollutants, this meal being fed at 10 in a preheating step 11, where it consecutively passes through suspension type cyclone heat exchangers 12, 13 and 14 in combined parallel flow/counter flow to a hot exhaust 15 of a calcination step 16, in order to be separated off in a lowest cyclone 17 from the hot exhaust stream 15 and introduced as a high-grade (e.g., 95%) calcinated cement raw meal 18 into an inlet chamber 19 of a rotary tubular kiln 20, in whose sintering zone it is combusted into cement clinker which is subsequently cooled in a clinker cooler 21 (a grate cooler in the exemplifying embodiment). The cooled cement clinker leaves the clinker cooler 21 at 22.

The exhaust 15 cooled by the cement raw meal leaves the preheating step 11 of the apparatus at 23. This exhaust 23 is freed of dust 25 in a dust trap, e.g., an electrostatic dust trap 24, and is subsequently let out as exhaust 27 via a main chimney 26.

The preheated cement raw meal 30 emerging from the second lowest cyclone step 14 is calcinated in a high-grade fashion in the calcination step 16, which is supplied with fuel 28 and tertiary air 29 from the clinker cooler 21.

A meal conduit 31 is bifurcated from the hot meal conduit 30 emerging from the second lowest cyclone step 14, this meal conduit 31 being directed into an upper region of the kiln inlet chamber 19, and, in fact, in the vicinity of an opening 32 through which, e.g., 5 to 10% of the rotary kiln exhaust amount is let out as a hot pollutant-containing bypass stream, or respectively, a gas sub-stream. The rotary kiln exhaust, which, in the short rotary tubular kiln 20, can comprise a vent temperature of, e.g., 1300° C. without further ado, is cooled to, e.g., 1150° C. by the meal which is introduced into the kiln inlet chamber 19 via conduit 31, whereby the highly thermally loaded inlet chamber 19 is protected. On the other hand, the meal particles introduced via conduit 31 serve as condensation nuclei at which the gaseous, or respectively, vaporous pollutants contained in the rotary kiln exhaust can condense. The condensation nuclei are then sucked in together with the gas sub-stream through the exhaust opening 32 into a mixing chamber 33 arranged outside the inlet chamber, water 34 being sprayed into this mixing chamber, thus further cooling the gas sub-stream loaded with the condensation nuclei from 1100° C., e.g., to 370° C., e.g., before the gas sub-stream 35 is then subsequently freed from pollutant containing dust 37 in a trap, particularly an electrostatic dust trap 36. The purified gas sub-stream 38 is let out via suction draught blower 39 and chimney 40, 41. A cooling tower which would otherwise be necessary for operating the electrostatic dust trap 36, and would be connected upstream thereto, is foregone for reasons of conditioning of the gas sub-stream.

Instead of the hot meal 31 or in addition to this, cold cement raw meal 43 (via conduit 44), kiln filter dust (via conduit 42) and/or particularly the rougher portion of the bypass filter dust 37 obtained from a separator/grader 45 and delivered via conduit 46 can be introduced into the kiln inlet chamber 19.

Given the use of only water 34 as cooling medium, and not of cool air, the volume of the gas sub-stream 35 and thus the structural size of the dust trap 36 are minimized. Seawater or industrial water or tap water can also be used as the water 34 sprayed into the gas sub-stream.

The invention achieves a very effective collection of dusts rich in alkali and chloride from gas sub-vents of cement clinker production lines.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A method for reducing pollutant circulations in an apparatus for the manufacture of cement clinker from raw meal, comprising the steps:

preheating the raw meal in a least one train of pipes of a heat exchanger by permeating the raw meal with an exhaust from a rotary tubular kiln;

combusting the raw meal into cement clinker in a sintering zone of the rotary tubular kiln;

cooling the cement clinker in a cooler, connected downstream of the rotary tubular kiln;

exhausting a pollutant-containing sub-stream of an exhaust stream of the rotary kiln from a rotary kiln inlet chamber by means of one of a bypass gas vent and a gas sub-vent;

introducing at least one of meal and processing dust developed during processing into an upper region of the rotary kiln inlet chamber as condensation nuclei and entraining the nuclei into the vented gas sub-stream; and cooling the vented gas sub-stream by the introduction of at least one of water and cool air to the vented gas sub-stream prior to its de-dusting in a dust trap.

2. A method according to claim 1, wherein the step of introducing at least one of meal and processing dust comprises introducing at least one of cold cement raw meal, hot meal, kiln filter dust and selected bypass filter dust.

3. A method according to claim 1, wherein the step of cooling the vented gas sub-stream comprises using one of fresh water, sea water, industrial water and tap water.

4. A method according to claim 1, wherein said step of preheating comprises utilizing a cyclone suspension type heat exchanger.

5. A method according to claim 4, wherein said heat exchanger comprises a vertical series of cyclone chambers, each having an upper gas and meal inlet, a lower meal outlet and an upper gas outlet, said step of introducing a condensation nuclei comprising providing an inlet into the upper region of the rotary kiln inlet chamber from a bifurcated conduit from the lower meal outlet of a second lowest cyclone chamber.

6. A method according to claim 1, including at least one dust trap positioned in an exhaust stream flowing out of the heat exchanger and wherein said step of introducing a condensation nuclei comprises providing an inlet into the upper region of the rotary kiln inlet chamber from a conduit leading from a dust collection outlet of the dust trap associated with the heat exchanger exhaust stream.

7. A method according to claim 1, wherein said step of introducing a condensation nuclei comprises providing an inlet into the upper region of the rotary kiln inlet chamber from a conduit leading from a dust collection outlet of the dust trap associated with the vented gas sub-stream.

8. A method according to claim 1, wherein said step of introducing a condensation nuclei comprises providing an inlet into the upper region of the rotary kiln inlet chamber from a conduit leading from a source of cold cement raw meal.

9. An apparatus for the manufacture of cement clinker from pollutant-containing raw meal, comprising:

a rotary tubular kiln having an exhaust outlet;

means for combusting the raw meal into cement clinker in a sintering zone of the rotary tubular kiln;

a heat exchanger connected to receive a portion of an exhaust stream from the exhaust outlet of the rotary tubular kiln and a supply of raw meal being fed to the rotary tubular kiln, wherein the raw meal is permeated with the exhaust from the rotary tubular kiln;

a cooler connected downstream of the rotary tubular kiln for cooling the cement clinker;

a vent for exhausting a pollutant-containing sub-stream of the exhaust stream of the rotary kiln positioned in a rotary kiln inlet chamber;

at least one inlet into an upper region of the rotary kiln inlet chamber for admitting and entraining at least one of meal and processing dust developed during processing into the vented gas sub-stream; and conduits for introducing a cooling fluid into the vented gas sub-stream upstream of a dust trap for the vented gas sub-stream.

10. An apparatus according to claim 9, wherein said heat exchanger comprises a vertical series of cyclone chambers, each having an upper gas and meal inlet, a lower meal outlet and an upper gas outlet, said one inlet into the upper region of the rotary kiln inlet chamber being connected to a bifurcated conduit from the lower meal outlet of a second lowest cyclone chamber.

11. An apparatus according to claim 9, including at least one dust trap positioned in an exhaust stream flowing out of the heat exchanger, wherein said one inlet into the upper region of the rotary kiln inlet chamber is connected to a conduit leading from a dust collection outlet of the dust trap associated with the heat exchanger exhaust stream.

12. An apparatus according to claim 9, wherein said one inlet into the upper region of the rotary kiln inlet chamber is connected to a conduit leading from a dust collection outlet of the dust trap associated with the vented gas sub-stream.

13. A method for reducing pollutant circulations in an apparatus for the manufacture of cement clinker from raw meal, comprising the steps:

preheating the raw meal in a heat exchanger by permeating the raw meal with an exhaust from a rotary tubular kiln;

combusting the raw meal into cement clinker in a sintering zone of the rotary tubular kiln;

exhausting a pollutant-containing sub-stream of an exhaust stream of the rotary kiln from a rotary kiln inlet chamber by means of a gas sub-vent;

introducing at least one of meal and dust developed during processing into an upper region of the rotary kiln inlet chamber as condensation nuclei and entraining the nuclei into the vented gas sub-stream;

cooling the vented gas sub-stream by the introduction of a cooling fluid to the vented gas stream; and, thereafter de-dusting the vented gas sub-stream in a dust trap.

14. A method according to claim 13, wherein said step of preheating comprises utilizing a cyclone suspension type heat exchanger.

15. A method according to claim 13, wherein said step of cooling the vented gas sub-stream comprises introducing cool air into the vented gas sub-stream.

16. A method according to claim 13, wherein said step of cooling the vented gas sub-stream comprises introducing water into the vented gas sub-stream.

17. A method according to claim 13, wherein said step of introducing a condensation nuclei comprises introducing cold cement raw meal into the upper region of the rotary kiln inlet chamber.

18. A method according to claim 13, wherein said step of introducing a condensation nuclei comprises introducing hot meal into the upper region of the rotary kiln inlet chamber.

19. A method according to claim 13, wherein said step of introducing a condensation nuclei comprises introducing kiln filter dust into the upper region of the rotary kiln inlet chamber.

20. A method according to claim 13, wherein said step of introducing a condensation nuclei comprises introducing selected bypass filter dust into the upper region of the rotary kiln inlet chamber.

* * * * *